United States Patent
Tsai et al.

[11] Patent Number: 5,398,133
[45] Date of Patent: Mar. 14, 1995

[54] HIGH ENDURANCE NEAR-INFRARED OPTICAL WINDOW

[75] Inventors: Rung-Ywan Tsai, Kaohsiung; Fang-Chuan Ho, Hsinchu, both of Taiwan, Prov. of China

[73] Assignee: Industrial Technology Research Institute, Hsinchu, Taiwan, Prov. of China

[21] Appl. No.: 141,634

[22] Filed: Oct. 27, 1993

[51] Int. Cl.⁶ .............................................. G02B 5/28
[52] U.S. Cl. ................................. 359/589; 359/359; 359/722; 359/634
[58] Field of Search ............... 359/356, 359, 722, 723, 359/890, 885, 589, 578, 580, 634

[56] References Cited
U.S. PATENT DOCUMENTS 3,996,461  12/1976  Sulzbach et al. ............... 250/214 R
5,243,458  9/1993  Hatano et al. ...................... 359/359

FOREIGN PATENT DOCUMENTS
1164352  9/1969  United Kingdom ............... 359/359

OTHER PUBLICATIONS
Bausch & Lomb Optical Co., "Infra-Red", Progress Report No. 3, Rochester, New York, Sep. 1958.

Primary Examiner—Georgia Y. Epps
Assistant Examiner—Thomas D. Robbins
Attorney, Agent, or Firm—H. C. Lin

[57] ABSTRACT

Multilayers of low refractive index amorphous silicon nitride and high refractive index amorphous silicon are interleaved to construct a near-infrared optical filter. For an edge filter, the structure is transparent to near-infrared light and opaque to visible light. For a bandpass filter, the low-pass filter is superimposed with a high-pass filter. Anti-reflection coating can be added to improve the transmittance. These multilayers are deposited with Plasma Enhanced Chemical Vapor Deposition technique.

14 Claims, 7 Drawing Sheets

HIGH ENDURANCE NEAR-INFRARED OPTICAL WINDOW

BACKGROUND OF THE INVENTION

In recent years, optical windows for near infrared light have received a great deal of attention for optical communication and other special applications. Such windows must be transparent to near-infrared light (typically with wavelength in the range of 800-1600 nm). At the same time, the windows should be capable of shielding against the transmission of light which may adversely affect the sensors behind the windows. Besides, the optical windows should be stable under different ambient conditions, and capable of resisting humidity and high temperature. The present known optical filters include absorption filters, diffraction filters generated by optical holographic techniques, and transmittive or reflective multiple layer (or multilayer) metal-dielectric or all dielectric filters as disclosed in U.S. Pat. Nos. 5,119,232, 5,007,689 and 4,865,405.

Absorption filters are usually composed of material which possesses intrinsic absorption in the desired optical range or material which is added with dye for absorption in the desired optical range. The drawback of these materials is the degradation of the performance of the filters due to the absorption of energy.

Diffraction filters generated by optical holographic techniques utilize photosensitive gelatine materials. However, such gelatine can easily be affected by ambient conditions, particularly humidity and heat. Such filters can only be used for low power light source or laser source.

Multilayered dielectric transmission or reflection filters are basically composed of alternating layers of materials with high refraction index and low refraction index deposited on a substrate. Due to limitation of the material, an all dielectric multilayered near-infrared optical window requires approximately 60 layers. Such techniques are described in the following articles: (1) J. A. Dobrowolski, "Coating and Filters", in *Handbook of Optics*, W. G. Driscoll, ed., McGraw-Hill Book Co., New York, 1978, Chapter 8; (2) J. A. Dobrowolski, J. R. Pekelsky and A. J. Waldorf, "Practical Megnetron Sputtering System for the Deposition of Optical Multilayer Coatings", *Appl. Opt.*, 31, pp.3784-3789 (1992). From the design and fabrication standpoint, such a structure is very difficult to realize. In addition, due to the large number of interfaces between the multilayers, there are many existing defects which can cause undesirable scattering or thermal damage as a result of extra light absorption and peeling of the layers.

SUMMARY

An object of this invention is to provide a near-infrared optical window which is structurally simple, easy to fabricate and superior in characteristic. Another object of this invention is to provide a near-infrared optical window which blocks the visible light and its interference effect. A further object of this invention is to provide a narrow-band optical filter in the near-infrared range.

These objects are achieved by utilizing the plasma-enhanced chemical vapor deposition (PECVD) technique to deposit alternate layers of amorphous silicon (a-Si:H) and amorphous silicon nitride (a-SiNx:H) on a Corning 7059 glass plate or a quartz plate. This kind of optical windows can be implemented by the combined use of anti-reflection coatings, edge filters, and narrow band-pass filters, etc. This novel near-infrared optical window has high transmittance, flat surfaces, simple structure, and high stability against humidity and heat in the near-infrared optical range. The adhesion between layers is strong and free from peeling. The use of PECVD renders the fabrication of a-Si: H/a-SiNx:H multilayer convenient, and improves the uniformity and reproducibility of the multilayers.

The principle of the present invention is based on the optical interference of thin films. The low refraction index amorphous silicon nitride layers and high refraction index amorphous silicon layers are alternately deposited on a Corning 7059 glass substrate. The amorphous silicon absorbs the visible light but is transparent to near-infrared light. The amorphous silicon nitride and the glass or quartz substrate are transparent to the visible light and the near-infrared light. With these thin film materials, optical windows can be made to be transparent to near-infrared light and opaque to visible light, such as edge filters and narrow band-pass filters. The PECVD technique simplifies the process and improves the reliability for fabricating stable a-Si:H/SiNx:H near-infrared optical windows.

DETAILED DESCRIPTION OF THE PREFERRED EMBODIMENT

Figure 1:
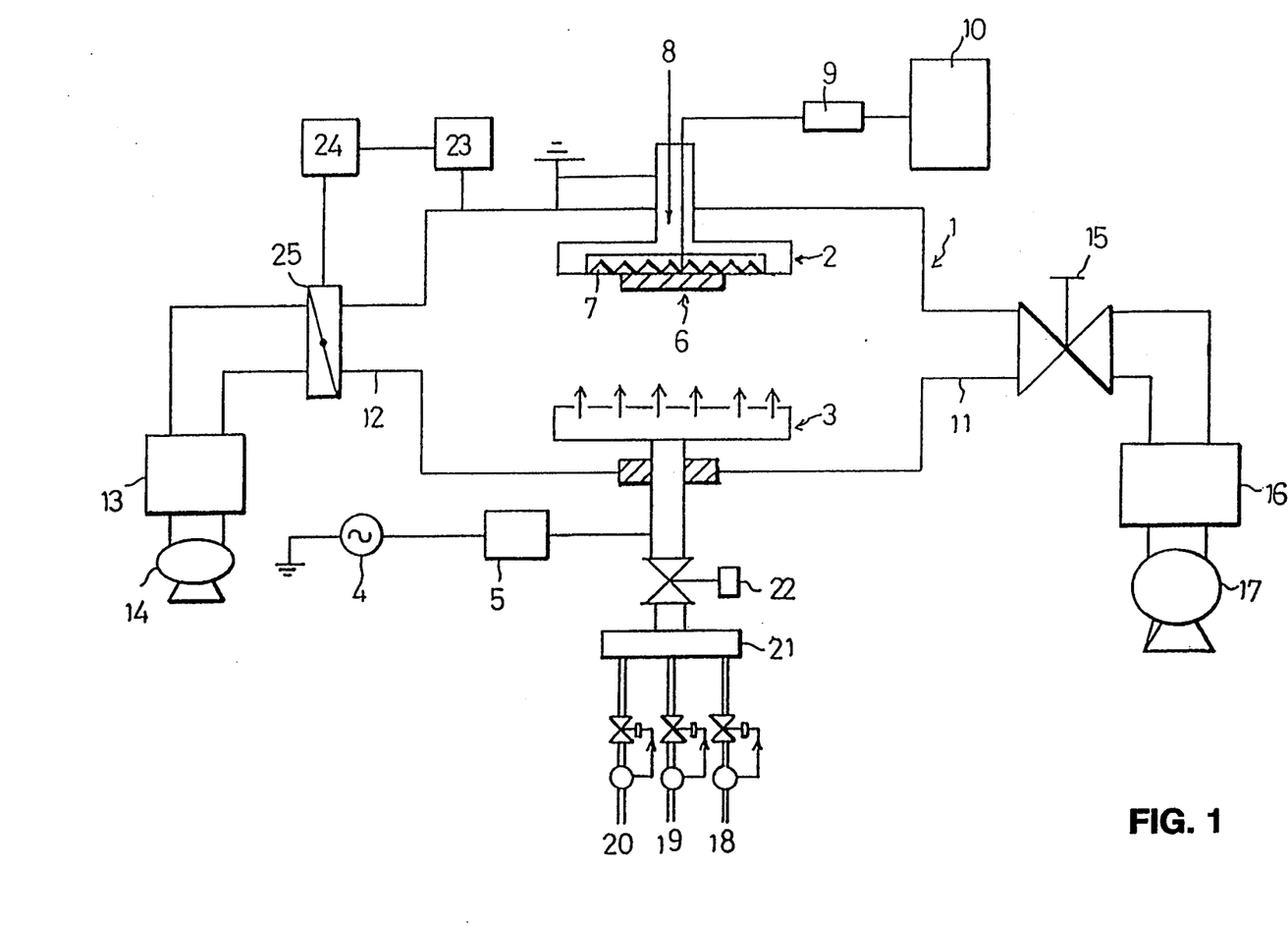
FIG. 1 shows the PECVD setup.

FIG. 1 shows the PECVD system used for the present invention. The PECVD system has two parallel electrodes, 21 cm in diameter and located in the vacuum chamber 1. The upper electrode 2 and the vacuum chamber are at ground potential as the anode. The lower electrode 3, which is connected to a 13.54 MHz rf power supply unit 4 and an impedance matching unit 5, is the cathode. A clean Corning 7059 glass substrate or a quartz substrate 6 is placed in the center of the upper electrode 2. The upper electrode 2 is equipped with heating and cooling elements to heat and cool the substrate 6. The heating element comprises a heating coil 7, a temperature controller 9 and a power supply 10, and is capable of controlling the temperature to ±1° C. The vacuum system comprises a main pumping port 11 and an auxiliary pumping port 12. For coarse exhaust, the auxiliary pumping port uses a Roots pump 13 and a mechanical pump to pump down the vacuum chamber to a pressure below $1\times 10^{-2}$ torr. Then the auxiliary pumping port 12 is closed, the main pumping port valve 15 is opened, and the vacuum chamber 1 is pumped down to a pressure of approximately $1\times 10^{-6}$ torr by the diffusion pump 16 and the mechanical pump 17. Three kinds of reactive gases, pure silane ($SiH_4$), pure ammonia ($NH_3$) and pure nitrogen ($N_2$), are individually fed through three mass flow controllers 18, 19, 20 into a mixing chamber 21, then through a valve 22 into the lower electrode 3, and finally sprayed into the vacuum chamber 1.

Prior to the vapor deposition, the substrate 6 is heated to 250° C. Then the main valve 15 of the main pumping port 11 is closed. The pressure in the reaction chamber 1 is automatically controlled to a predetermined pressure by the pressure gauge 23, the controller 24 and the control valve 25. When the a-Si:H is deposited, the reaction gas is pure silane: the flow rate is 10 standard cubic centimeters/min (sccm); the total pressure is 0.36 torr, the rf output power is 8 W. The reaction gas passes through an automatic check valve 15 to reach the lower electrode 3. A plasma is produced between the two electrodes, spaced 2 cm apart. When a-SiNx:H is deposited, the reaction gases are pure silane, pure ammonia and pure nitrogen; the flow rates are 2.5, 4, 100 sccm respectively; the total pressure is set at 0.5 torr; the rf power is 100 W; the spacing between the two electrodes is 4 cm. When a-Si:H/a-SiNx:H multilayers are prepared, the alternate deposition cycle can be exercised in situ without removing the sample. The deposition time for each layer is determined by the thickness divided by the deposition rate. After the coating process, the rf power supply 4, and the heater power supply 10 and the reactant gas valve 22 are sequentially deactivated. When the substrate is cooled below 150° C., cooling water 8 flows into the upper electrode 2. When the substrate temperature is cooled to room temperature, the chamber is vented and the sample is removed.

Figure 2:
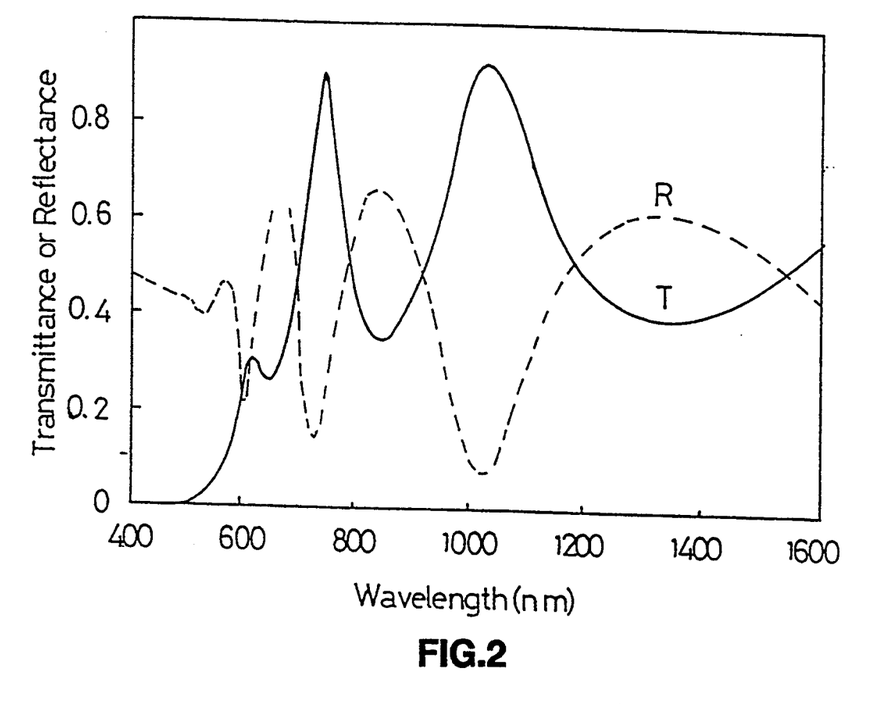
FIG. 2 shows the transmittance and near-normal reflectance curves of the a-Si:H prepared by PECVD.
Figure 3:
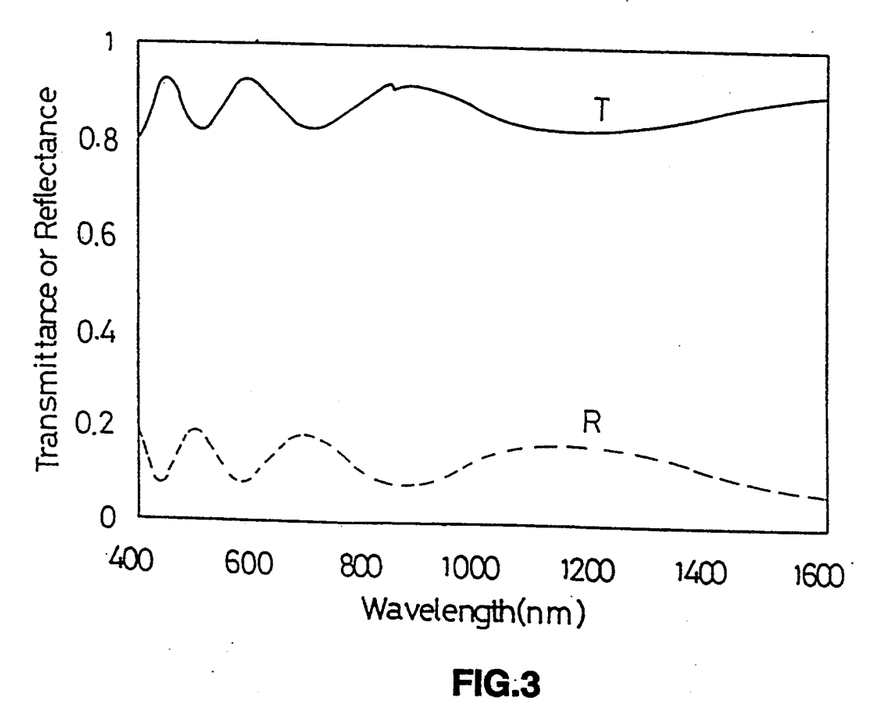
FIG. 3 shows the transmittance and near-normal reflectance curves of the a-SiNx:H prepared by PECVD.

FIG. 2 and FIG. 3 show respectively the transmittance and near normal (5°) reflectance curves of the amorphous silicon and amorphous silicon nitride as deposited by the PECVD method. All the measurements were made with a Hitachi U4001 spectrophotometer under standard atmosphere. From FIG. 2, it can be seen there is no absorption in the near-infrared range, but there is absorption in the visible light range and the degree of absorption increases with decreasing wavelength. FIG. 3 shows that the amorphous silicon nitride does not have absorption in both the visible and the near-infrared range. From the analytic method proposed by J. A. Dobrowolski, F. C. Ho and A. Waldorf in the paper "Determination of Optical Constants of Thin Films Coating Materials Based on Inverse Synthesis", *Appli. Opt.*, 22, 3191–3200 (1983), the refraction index and the thickness can be calculated from the transmittance and the reflectance curves. At the reference wavelength of $\lambda_o=500$ nm, the refraction index for the amorphous silicon and the amorphous silicon nitride are respectively equal to 3.62-0.3i and 1.82. Therefore, by utilizing the marked difference in refractive index of the two materials, the difference in absorption coefficients and the convenience in producing the materials with PECVD, it is very easy to design and fabricate optical windows in the near-infrared range with multilayers of a-Si:H/a-SiNx:H.

Figure 4:
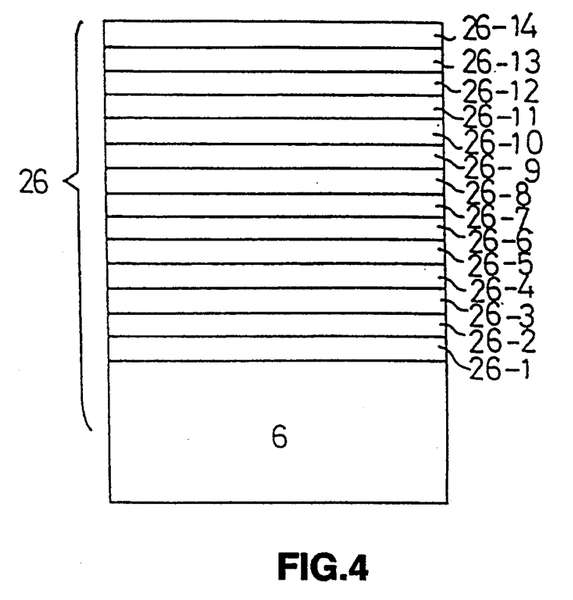
FIG. 4 shows the cross-section view of a 14-layer edge filter with the period of a-Si:H/a-SiNx:H.

FIG. 4 shows cross-section view of a 14-layer edge filter with alternating deposition of a-Si:H/a-SiNx:H on a Corning 7059 glass substrate 6. The filter structure is described in Table 1:

TABLE 1

| Layer No. | Material | Geometrical thickness (nm) | Optical thickness (nm) | Refraction index ($\lambda_o = 500$ nm) |
|---|---|---|---|---|
| Substrate | Corning 7059 glass | 200 | | 1.52 |
| 26-1 | a-Si:H | 11.42 | 41.3 | 3.62-0.3i |
| 26-2 | a-SiNx:H | 130.7 | 237.9 | 1.82 |
| 26-3 | a-Si:H | 33.47 | 121.2 | 3.62-0.3i |
| 26-4 | a-SiNx:H | 77.06 | 140.2 | 1.82 |
| 26-5 | a-Si:H | 58.68 | 212.4 | 3.62-0.3i |
| 26-6 | a-SiNx:H | 42.10 | 76.6 | 1.82 |
| 26-7 | a-Si:H | 85.26 | 308.6 | 3.62-0.3i |
| 26-8 | a-SiNx:H | 52.50 | 95.6 | 1.82 |
| 26-9 | a-Si:H | 50.21 | 181.8 | 3.62-0.3i |
| 26-10 | a-SiNx:H | 86.17 | 156.8 | 1.82 |
| 26-11 | a-Si:H | 48.49 | 175.5 | 3.62-0.3i |
| 26-12 | a-SiNx:H | 66.85 | 121.7 | 1.82 |
| 26-13 | a-Si:H | 45.20 | 163.6 | 3.62-0.3i |
| 26-14 | a-SiNx:H | 184.99 | 336.7 | 1.82 |
| | Air | | | 1 |

The thickness of each layer is different. The a-SiNx:H layer (designated as layer 26-14 in FIG. 4) furthermost from the substrate is the thickest. The total geometrical thickness is 973.1 nm.

Figure 5:
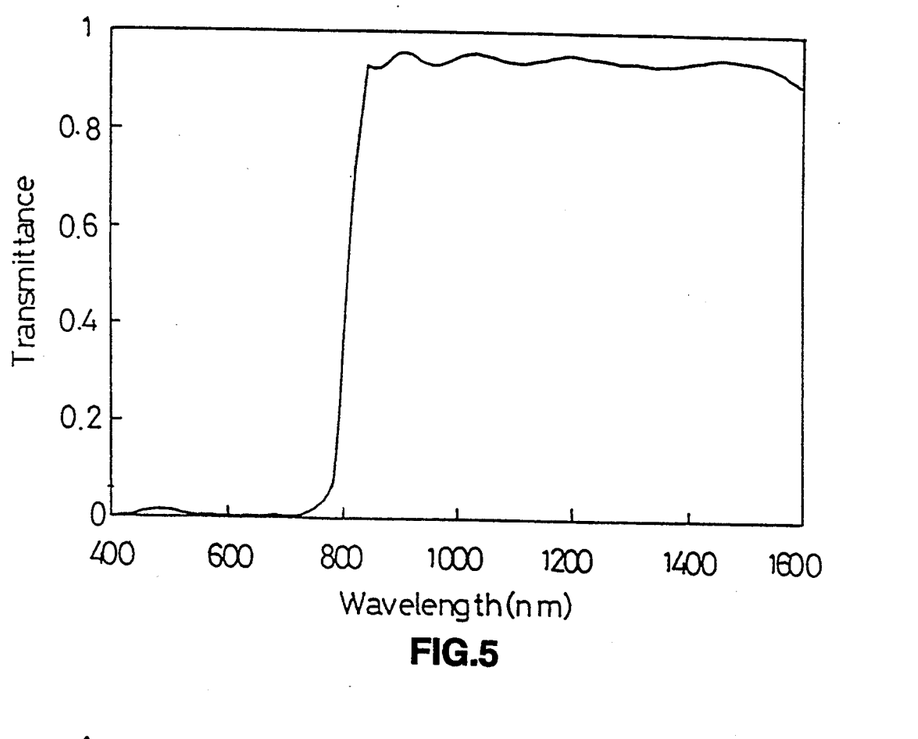
FIG. 5 shows the transmittance of the filter shown in FIG. 4.
Figure 6:
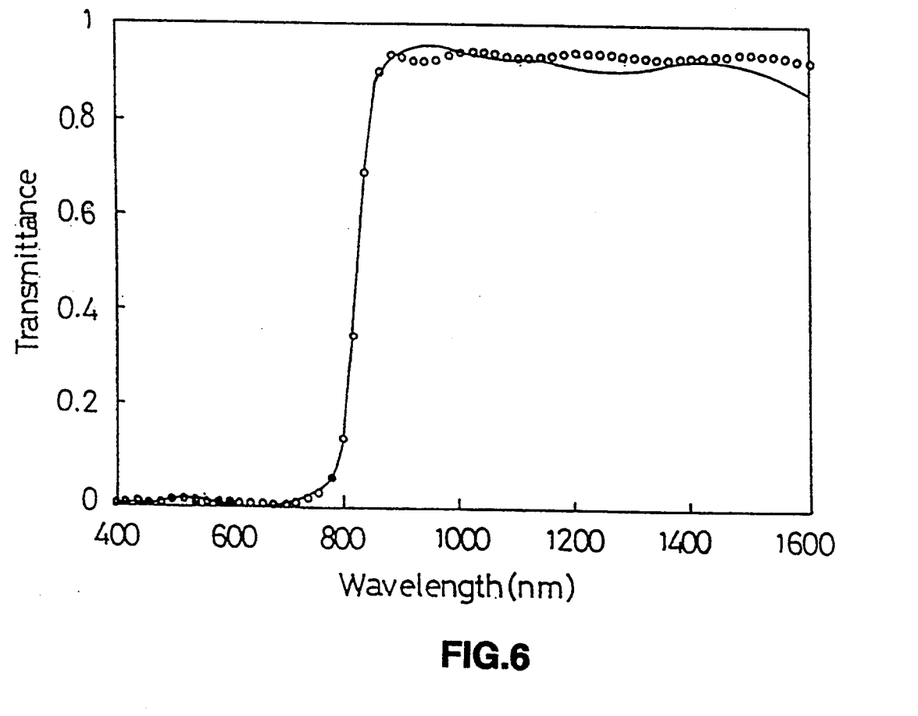
FIG. 6 shows the measured transmittance of a 15-layer edge filter of a-SiNx:H/a-Si:H.

The solid curve in FIG. 5 is the transmittance curve of the 14-layer edge filter. With the present design using relatively small number of layers and relatively thin thicknesses, a wide transmission band in the range of 850–1600 nm is obtained. The transmittance is as high as 95%. However, the transmittance in the visible range is nearly equal to zero. Meanwhile, the transition region between the pass band and the stop band is very narrow. The ratio of the transmittances at wavelengths of 840 nm and 740 nm ($=T_{840}/T_{740}$) is larger than 100. The thickest outer layer of a-SiNx:H (26-14) can serve as a protective layer to improve the stability against ambience. FIG. 6 shows the measured transmittance curve of a 15-layer edge filter of a-SiNx:H/a-Si:H. Small circles represent the theoretical values, as explained in a paper by R. Y. Tsai, L. C. Kao, F. C. Ho, "Amorphous Si:H and Amorphous SiNx:H Prepared by Plasma-enhanced CVD as Coating Materials", *Appl.Opt.*, 32, pp.5561–5566 (1993). From this figure, it can be seen that the measured values are in good agreement with the theoretical values, and that the PECVD process can reliably be used to produce the a-SiNx:H/a-Si:H multilayers. The stability of such optical filters has also been proven. After exposing in air for 10 months at room temperature, samples were dipped in boiling water for 10 minutes. No peeling was observed, and the measured transmittance was nearly same as freshly coated samples.

Figure 7:
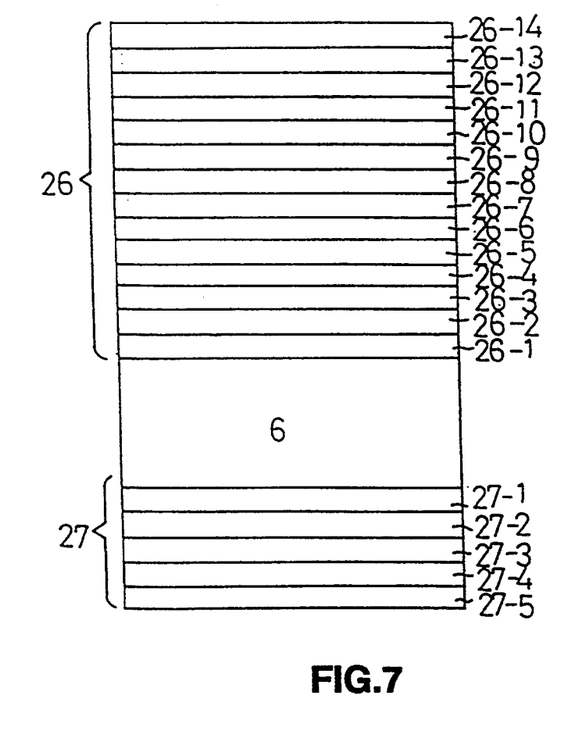
FIG. 7 shows the cross-section view of the superposition of a 14-layer edge filter shown in FIG. 4 and a 5-layer anti-reflection coating.

For the improvement of transmittance in the near-infrared signals and the avoidance of loss due to reflection at the uncoated side of the substrate, an anti-reflection coating 27 is coated on the opposite side of the substrate. FIG. 7 shows the cross-section of such a structure. This anti-reflection coating 27 is also deposited by PECVD. Five alternate multilayers of a-SiNx:H with low refraction index and a-Si:H with high refraction index are deposited on the glass substrate. The construction parameters of the 5-layer anti-reflection coating are described in Table 2.

TABLE 2

| Layer | Material | Geometrical thickness (nm) | Optical thickness (nm) | Refraction index ($\lambda_o$ = 500 nm) |
| --- | --- | --- | --- | --- |
| Substrate | Corning 7059 glass | | | 1.52 |
| 27-1 | a-SiNx:H | 178.67 | 325.2 | 1.82 |
| 27-2 | a-Si:H | 31.33 | 113.4 | 3.62-0.3i |
| 27-3 | a-SiNx:H | 64.82 | 118.0 | 1.82 |
| 27-4 | a-Si:H | 39.87 | 144.3 | 3.62-0.3i |
| 27-5 | a-SiNx:H | 178.60 | 325.1 | 1.82 |
| | Air | | | 1 |

Figure 8:
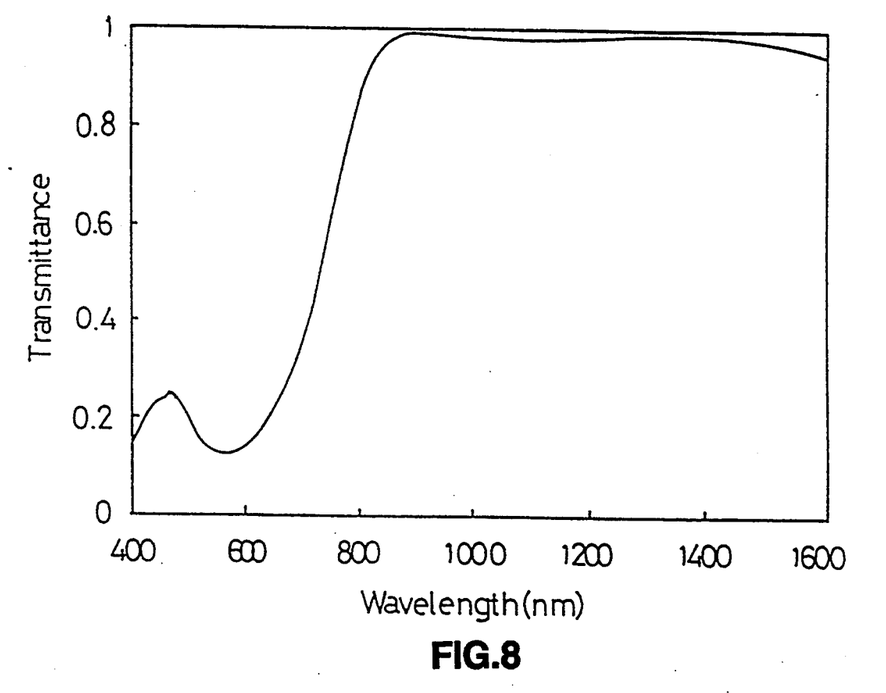
FIG. 8 shows the transmittance curve of the near-infrared anti-reflection coating.
Figure 9:
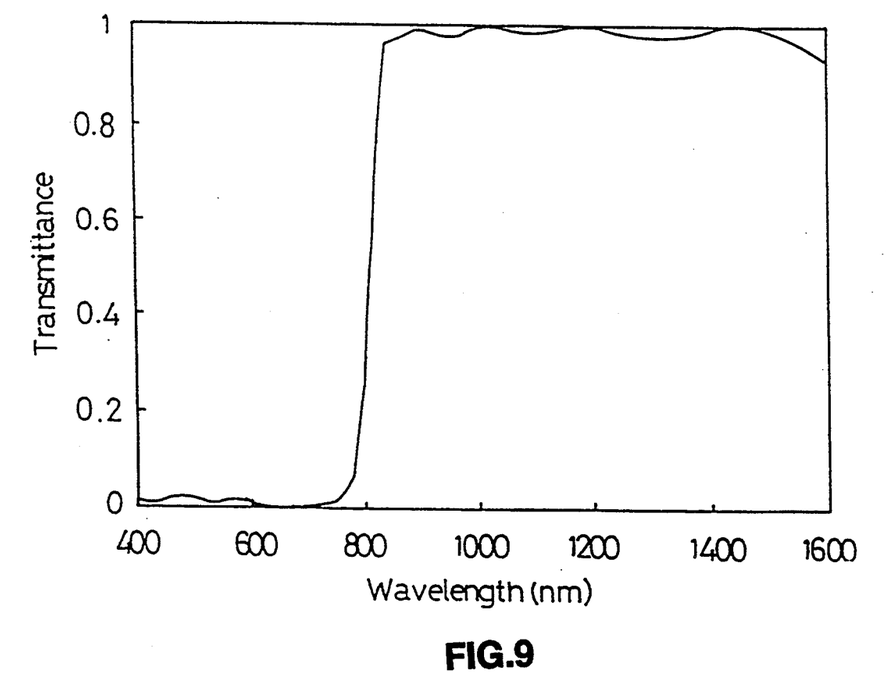
FIG. 9 shows the transmittance curve of the edge filter shown in FIG. 7.

The outermost layer (27-5) is a-SiNx:H to increase the scratch resistance. FIG. 8 shows the transmittance curve of the designed anti-reflection coating 27. The transmittance in the near-infrared range of 860–1480 nm is higher than 98%. A portion of the transmittance is higher than 99%. FIG. 9 shows the transmittance curve of the edge filter with anti-reflection coating 27. In comparison with the transmittance of the near-infrared filter without any anti-reflection coating shown in FIG. 5, it can be seen that the transmittance in the 850–1600 nm near-infrared range is increased by an average of 4%. At 99% transmittance, only 1% of the near-infrared signal is lost.

Figure 10:
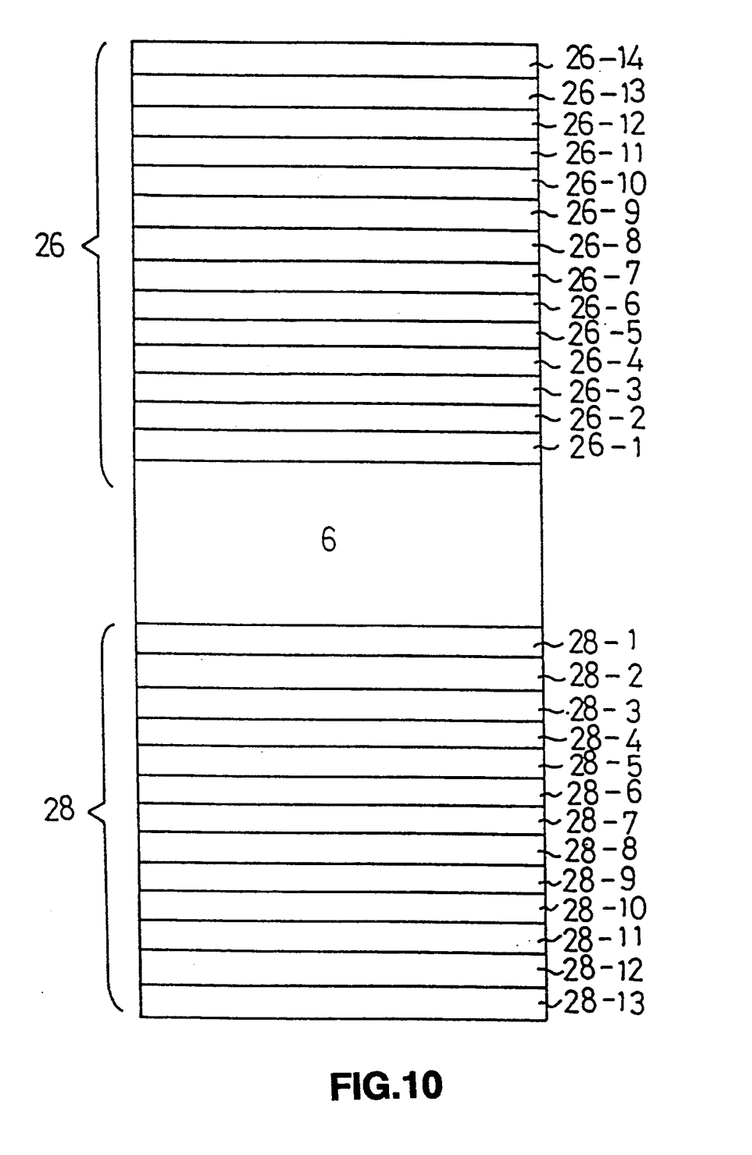
FIG. 10 shows the cross-section view of a near-infrared narrow band-pass filter.

Besides the near-infrared edge filter, other kinds of optical filter can be implemented using the superposition principle. When the backside of the substrate of the near-infrared edge filter shown in FIG. 4 is coated with a low-pass filter 28, a narrow band-pass filter is obtained. The location of the narrow pass-band is determined by the number and thickness of the layers of the near-infrared high-pass filter 26 and the low pass filter 28. FIG. 10 shows the cross-section of the structure of narrow band-pass filter based on this invention. There are 14 layers for the near-infrared high-pass filter and 13 layers for the low-pass filter 28. Table 3 describes the construction parameters of the 13-layer low-pass filter with the a-SiNx:H as the last layer furthermost from the substrate.

TABLE 3

| Layer | Material | Geometrical thickness (nm) | Optical thickness (nm) | Refraction index ($\lambda_o$ = 500 nm) |
| --- | --- | --- | --- | --- |
| Substrate | Corning 7059 glass | | | 1.52 |
| 28-1 | a-SiNx:H | 69.73 | 126.9 | 1.82 |
| 28-2 | a-Si:H | 99.84 | 361.4 | 3.62-0.3i |
| 28-3 | a-SiNx:H | 177.52 | 323.1 | 1.82 |
| 28-4 | a-Si:H | 88.92 | 321.9 | 3.62-0.3i |
| 28-5 | a-SiNx:H | 174.76 | 318.1 | 1.82 |
| 28-6 | a-Si:H | 87.56 | 317 | 3.62-0.3i |
| 28-7 | a-SiNx:H | 173.24 | 315.3 | 1.82 |
| 28-8 | a-Si:H | 87.97 | 318.5 | 3.62-0.3i |
| 28-9 | a-SiNx:H | 176.86 | 321.9 | 1.82 |
| 28-10 | a-Si:H | 87.21 | 315.7 | 3.62-0.3i |
| 28-11 | a-SiNx:H | 174.12 | 316.9 | 1.82 |
| 28-12 | a-Si:H | 91.78 | 332.3 | 3.62-0.3i |
| 28-13 | a-SiNx:H | 72.72 | 132.3 | 1.82 |
| | Air | | | 1 |

Figure 11:
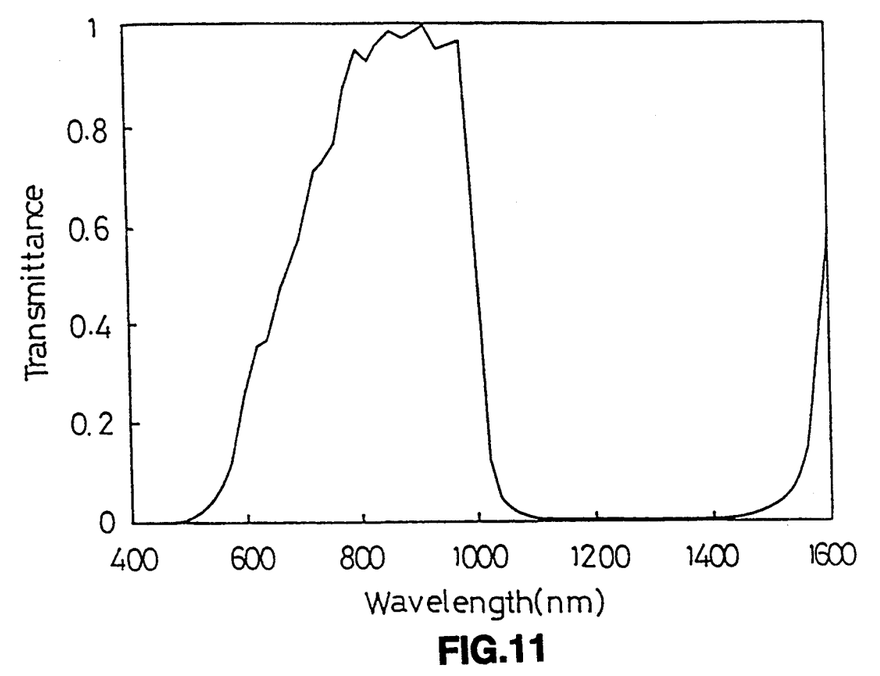
FIG. 11 shows the transmittance curve of a low-pass filter.

FIG. 11 shows the transmittance of the low-pass filter 28 based on this present invention. In the 800–980 nm wavelength range, the transmittance is over 95% and overlaps with transmission band of the near-infrared edge filter shown in FIG. 5. In the 1040–1500 nm wavelength range, the transmission is nearly equal to zero. Thus a portion of the near-infrared light is blocked.

Figure 12:
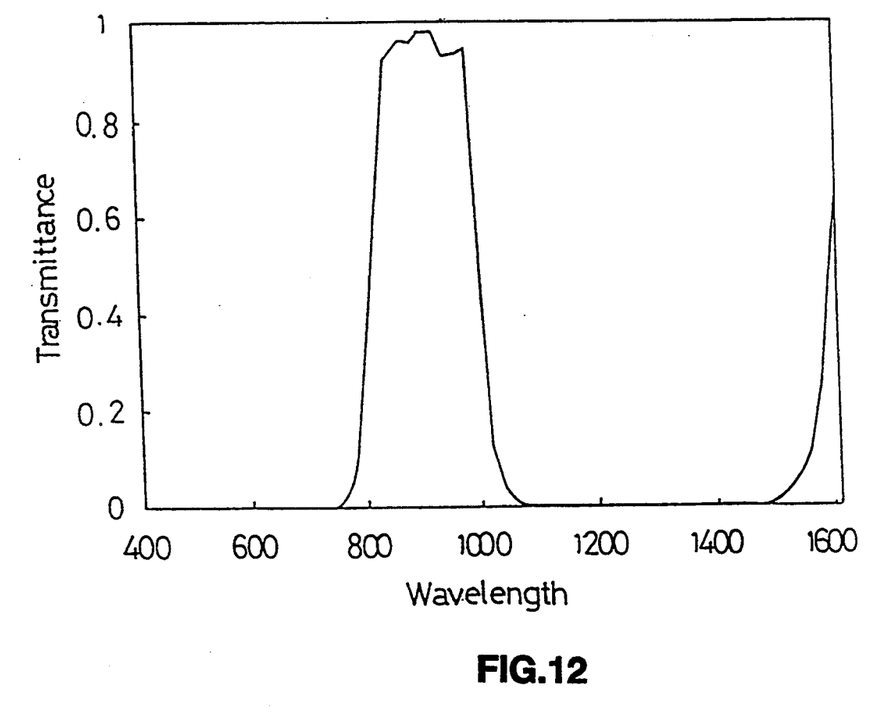
FIG. 12 shows the transmittance curve of a narrow band-pass filter.

FIG. 12 shows the transmittance of the narrow band-pass filter based on the present invention. The transmittance in the 800–1000 nm range is peaked at 99.23% and has a bandwidth of 185 nm with a nearly rectangular shape.

This invention is not limited to the edge filter and the band-pass filter just described. Other near-infrared edge filters and band-pass filters can also be fabricated by PECVD using the a-Si:H/SiNx:H multilayers for simplicity in processing and high reliability. The multilayers can be deposited on both sides of the substrate utilizing the superposition principle. Alternatively, two filters can be processed separately and glued together afterwards to obtain a final optical filter.

This invention basically utilizes the PECVD technique to deposit multilayers of a-Si:H/a-SiNx:H and the superposition principle to realize near-infrared optical windows, which include edge filters, anti-reflection coatings and narrow band-pass filters. Such near-infrared windows can stop the transmission of visible light, avoid the interference of the visible light to the sensors behind the windows, and transmit over 98% of the near-infrared signal. Besides simplicity in processing and high reliability, the number of layers is less than that using other techniques to achieve equivalent performance. The adhesion of the layers is very strong, unlike other dielectric multilayers which may suffer from abnormal scattering or absorption of light and poor adhesion, and other kinds of absorption filter which may attenuate the transmitted light. The stability against ambience and heat is superior to the diffraction filters generated by optical holographic techniques.

The near-infrared optical windows based on the present invention have the following advantages:

(1) High transmittance: In the near-infrared range (800–1600 nm), the transmittance can be over 98% and is suitable for windows in sensors and communication applications.

(2) Freedom from visible light interference: The windows can completely stop the transmission of visible light and avoid the interference of visible light on near-infrared sensing and communication devices.

(3) Stability: The optical and physical properties are stable and not easily affected by varying ambient conditions. Besides, the adhesion of the coatings is strong and long lasting.

(4) Simple processing: The PECVD technique is highly reliable and simple to process, and can be extended to the design and fabrication of other types of optical filters.

(5) Low cost: The number of layers for the optical filter is less than 20, far less than traditional method of using over 60 layers. Thus the fabrication cost is lower and the process is simpler. The reduction in the number of layers results the reduction of the peeling rate between layers. Thus the stability is improved.

What is claimed is:

1. A near infrared optical filter, comprising:
   a substrate which is transparent to visible and near infrared light;
   a first set of refractive index layers composed of amorphous silicon nitride (a-SiNx:H) which is transparent to visible and near-infrared light;
   a second set of layers, having a refractive index greater than that of said first set of layers, composed of material which is transparent to near-infrared light but absorptive to visible light;

said first set of layers and said second set of layers being interleaved and deposited over said substrate.

2. A near-infrared optical filter as described in claim 1, wherein the total number of said first set of layers and said second set of layers is less than 20.

3. A near-infrared optical filter as described in claim 1, wherein the refractive index of said amorphous silicon nitride is 1.82 at a wavelength of 500 nm.

4. A near-infrared optical filter as described in claim 3, wherein said filter is transparent to near-infrared light and opaque to visible light.

5. A near-infrared optical filter as described in claim 3, wherein the refractive index of the second set of layers is 3.62–0.3i at a wavelength of 500 nm.

6. A near-infrared optical filter as described in claim 5, wherein the high refractive index is 3.62–0.3i at a wavelength of 500 nm.

7. A near-infrared optical filter as described in claim 3, wherein said substrate is quartz.

8. A near-infrared optical filter as described in claim 3, wherein said first set of layers are deposited with PECVD technique.

9. A near-infrared optical filter as described in claim 3, wherein said second set of layers are deposited with PECVD technique.

10. A near-infrared optical filter as described in claim 3, wherein an anti-reflection film is coated on the side of the substrate opposite to where said first set of layers and said second set of layers are interleaved.

11. A near-infrared optical filter as described in claim 3, wherein said anti-reflection film is transparent to near-infrared light.

12. A near-infrared optical filter as described in claim 3, wherein a second near-infrared filter of similar structure as said filter is attached by glueing the substrate of the second near-infrared filter back-to-back with said substrate.

13. A near-infrared optical filter as described in claim 3, wherein said filter is a narrow band-pass filter.

14. A near-infrared optical filter as described in claim 3, wherein said first set of layers and said second set of layers are deposited on both sides of said substrate, the layers on one side of the substrate forming a low-pass filter, the layers on second side of the substrate forming a high-pass filter.

* * * * *